United States Patent Office 3,672,941
Patented June 27, 1972

3,672,941
PROCESS FOR PREPARING A PIGMENT
COATED PAPER
Kozo Konishi, Michio Otake, Tatuo Maeda, and Kuniaki Maruyama, Mishi Kubiki-gun, Japan, assignors to Denki Kagaku Kogyo Kabushiki Kaisha, Tokyo, Japan
No Drawing. Filed July 28, 1969, Ser. No. 845,573
Claims priority, application Japan, July 31, 1968,
43/53,591; Nov. 15, 1968, 43/83,262
Int. Cl. B44d 1/44; D21h 1/20
U.S. Cl. 117—62                                    3 Claims

ABSTRACT OF THE DISCLOSURE

A paper coating pigment binder composition having an improved flowability and water-resistant property and a process thereof can be completed by using as a pigment binder composition a saponified product of vinyl acetate-acryl amide copolymer or a copolymer of vinyl acetate, acryl amide and one or more other copolymerizable monomer, with the co-use of aqueous zinc salt or aluminum solution.

BACKGROUND OF THE INVENTION

For the purpose of providing a smooth surface having a large ink-acceptability for printing a paper and paper board (hereinafter refer to paper), giving an ornamental effect to the paper and reducing roughness and irregularity of the paper surface, it is the practice to coat the paper with a pigment-containing composition, usually referred to as a "color." (This method is hereinafter called "a clay coating.")

In general, for the purpose of setting these pigments on the paper surface, the above-mentioned color is compounded with a suitable binder, and heretofore starch, casein or protein, styrene-butadiene copolymer latex and acrylic resin emulsion, etc. have been employed as the binder.

In general the amount of binder to be used is preferably as small as possible, since the optical properties such as whiteness, opacity, gloss, etc. are improved as the amount of binder is reduced.

However, the strength of coating layer and the binding strength between the coating layer and the paper surface are decreased when the amount of binder is reduced. Thus the amount of binder has a certain lower limit and the binder described above is generally used in the amount of 12 to 30 parts, by weight, per 100 parts, by weight, of pigment.

Alternatively, it has been hitherto known that polyvinyl alcohol (hereinafter called "PVA") can be used as a strong pigment binder, and that a paper having excellent optical properties can be obtained by using PVA as a pigment binder since PVA has a strong adhesive power for pigment and gives sufficient strength to the surface coating with a small amount of PVA.

However, with a PVA binder composition there are problems in respect of its fluidity, water-resistance, etc. at the time of application. Thus, when using a blade coating machine, for example, an extremely high shearing force develops and thus causes a surface unevenness called "streak," on the other hand, if a roll coater or size press is used to apply such a color, with a PVA binder, the coated surface exhibits the irregularity called "pattern."

Now, as the result of studies for obtaining an excellent pigment binder by improving the flowability of PVA used as a pigment binder without lowering its excellent inherent properties, the present inventors have found that a color having an improved flowability can be obtained while retaining the inherent advantages of PVA by using as a pigment binder a saponified product of vinyl acetate-acryl amide copolymer which is obtained by copolymerizing vinyl acetate and acryl amide and then saponifying resultant copolymer.

Besides, in order to obtain smooth even surface of the coated paper having intensive gloss, various methods have been heretofore proposed for solving the problem of water-proofing, for example, treatment by water gloss solution (this treatment is also called "water treatment" or "water gloss treatment") has been known. However, in such method, due to the insufficient water-resistance of PVA there unfavorably occur stains on the surface of calender roll and luster press. Further, even if "water treatment" is subjected to the painted paper, thus obtained paper cannot be used in practice, because of inferior printability by low ink acceptability.

Heretofore, in order to solve the above-mentioned problems the method of using an aqueous PVA solution added with an suitable water-proofing agent has been known. However, in this method, an acidic catalyst is jointly used to provide sufficient water-proofing property to a PVA film, thereby relatively high temperature heat treatment being required for a relatively long time, and therefore increasing initial adhesiveness lowered workability. Hence sufficient initial adhesiveness can not be obtained by drying and heating for a short period in the painting step and the resulting coating suffer from the defect of being sticky.

SUMMARY OF THE INVENTION

A color coating method characterized by employing (I) A paper coating pigment binder composition which consists of (A) saponified product of vinyl acetate-acryl amide or a saponified product of a copolymer of vinyl acetate, acryl amide and one or more of other copolymerizable monomers and (B) 1–30% by weight, based on a said saponified copolymer, of aluminum salts, whereby in said vinyl acetate-acryl amide copolymer or a copolymer consisting of vinyl acetate, acryl amide and one or more of other copolymerizable monomers, not less than 75 mol percent of acetate group being saponified, in thus saponified product 0.5–40 mol percent of acryl amide being contained and the content of saponified product of acryl amide in said saponified copolymer being not more than 3 mol percent. (II) A method for preparing coated paper characterized by coating with use of the saponified copolymer for color coating as set (I) and thereafter subjecting to the water gloss solution treatment by aluminum salt aqueous solution, which is water soluble and the aqueous solution of which is colorless.

DETAILED DESCRIPTION OF PREFERRED EMBODIMENT

Thus the object of the present invention is to provide a color coating method characterized by employing paper coating pigment binder composition having excellent flowability and water-resistance at the time of painting.

This invention further relates to a process for preparing pigment coated paper which is characterized by subjecting "water treatment" with the solution of zinc salts or aluminum salts after painting by using as the binder the saponified product of vinyl acetate-acryl amide copolymer or a copolymer consisting of vinyl acetate, acryl amide and one or more of other polymerizable monomers.

Vinyl acetate-acryl amide copolymer or a copolymer of vinyl acetate, acryl amide and one or more of other copolymerizable monomers which is used in this invention is obtained by adding, at the time of polymerizing vinyl acetate, acryl amide or acryl amide together with other copolymerizable monomer. In this case addition method have to be carefully studied so that acryl amide or acryl amide and other copolymerizable monomer can be uniformly distributed in the resulting copolymer.

More specifically, in case of copolymerizing vinyl acetate and acryl amide wherein the reactivity ratio of vinyl acetate ($M_1$) and acryl amide being $r_1=0.07$ and $r_2=7.5$ respectively, it is better to gradually copolymerize the monomers by slowly adding acryl amide to polymerizing vinyl acetate so as to obtain uniform copolymer.

Other monomers copolymerizable with vinyl acetate and acryl amide are acrylic acid, methacrylic acid, acrylate ester, methacrylate ester, acrylonitrile, crotonic acid, maleic anhydride, etc.

The amount of these third components shall be not more than 3 mol percent because of the limitation of preparation condition and in order to avoid viscosity increase of color.

The amount of acryl amide contained in these copolymers is preferably in the range of 0.5–40 mol percent. When the content is not less than 40%, there is found unfavorable poor workability such such as sticking etc., at the time of color preparation.

Further, from the point of improving effect of water-resistance and printability by "water treatment" the content shall be at least 0.5 mol percent.

Generally, the higher the saponified degree is, the more satisfactory the water resistance and the surface strength of the resultant composition are. And not less than 75 mol percent of acetate group in the copolymer is desirably saponified so that thus saponified product can be obtained in the form of white, water-soluble powder and can be easily handled in the subsequent process and for transportation.

Similarly, in order to keep the high water resistance, the polymerization degree of the said copolymer is preferably in the range of, but not limited to, 800–1500.

Zinc salts and aluminum salts employed as the component of pigment binder are, for example, zinc sulfate, zinc acetate, zinc chloride, etc. and aluminum chloride, aluminum sulfate, aluminum alum, etc. Other zinc or aluminum salts of which aqueous solutions are colorless can be also employed.

The amount of these salts employed is preferably not more than 1 part based on 100 parts of pigment, in order to obtain stable color.

These salts can also be used in the form of solution by dissolving into above-mentioned "water treatment solution." In this case to avoid the corrosion on the surface of calender roll, luster press, etc. the concentration of salt might be suitably defined, though the stains on calendar roll and luster press will be reduced as much high concentration of salts is employed.

Accordingly, the salt concentration in water treatment solution is preferably in the range of, but not limited to, 0.2–10.0% by weight.

The present invention will be further illustrated with the following examples.

Example 1

A mixture of 5000 parts of vinyl acetate, 3100 parts of methanol and 6.2 parts of 2,2'-azobis-isobutyronitrile was supplied in a polymerization vessel, and then while substituting with nitrogen gas the reactor was, under stirring, heated by conducting hot water into the jacket.

When the reflux of the polymerization liquid started, 1900 parts of mixture of 38% (by weight) of methanol and 62% (by weight) of vinyl acetate containing 380 parts of acryl amide were added dropwise for about 140 minutes and then polymerization was further continued for about 6 hours to obtain a methanol solution of vinyl acetate-acryl amide copolymer, with the polymerization yield being about 80%.

After that residual non-polymerized vinyl acetate was removed by the conventional method.

Next, the concentration of the copolymer in said methanol solution was adjusted to 40% and neutralized with 10% (by weight) NaOH-methanol solution containing $\frac{1}{25}$ mol equivalent (base on vinyl acetate component in the vinyl acetate-acryl amide copolymer) of NaOH, thereafter the saponification reaction being carried out at 40° C. for 2 hours.

The saponified copolymer thus obtained was white powders having polymerization of 1200, saponification degree of 99 mol percent, acryl amide content of 8.0%, and carboxyl group content, which was converted by saponification of acryl amide, of 0.5 mol percent.

Alternatively, articles according to the present invention Nos. 1 to 5 and control article Nos. 1 and 2 shown in Table 1 were obtained by varying the amount of acryl amide to be added and sodium hydroxide to be used and further by employing as the third component acrylic acid, crotonic acid and methyl ester of acrylic acid.

TABLE 1

| Binder | Saponified copolymer | | | |
|---|---|---|---|---|
| | Acryl amide content (mol percent) | Carboxyl group content (mol percent) | Saponification degree (mol percent) | Average polymerizatio degree |
| Present invention: | | | | |
| No. 1 | 8.0 | 0.5 | 99.0 | 1,200 |
| No. 2 | 10.8 | 0.2 | 88.2 | 1,210 |
| No. 3 | 19.8 | 2.8 | 98.7 | 1,230 |
| No. 4 | 8.0 | 2.7 | 98.7 | 1,180 |
| No. 5 | 10.6 | 2.5 | 99.0 | 1,210 |
| Control: | | | | |
| No. 1 | 0.3 | 0.05 | 99.1 | 1,126 |
| No. 2 | 0 | 0 | 99.5 | 1,100 |

NOTE.—
1. Acryl amide content was calculated from $N_2$ analysis. Carboxyl group content which shows partially saponified amount in the saponification reaction of acryl amide contained in said copolymer was calculated by subtracting the acryl amide content in the saponified copolymer from the amount of acryl amide used in the polymerization.
2. Articles No. 1 and No. 2 according to the present invention are two component copolymer of vinyl acetate and acryl amide.
3. Articles No. 3, No. 4, and No. 5 according to the present invention employ as the third component acrylic acid, crotonic acid and methyl ester of acrylic acid, respectively.
4. Control article No. 2 is polyvinyl-alcohol.
5. Saponification degree shows the conversion rate to hydroxyl group from acetate group of said copolymer.

Then coating color in Table 2 was prepared as follows: Tetrasodium pyrolic acid as the dispersion agent was sufficiently dissolved and clay was added slowly thereto under vigorously stirring to form a uniform slurry, and the aqueous solution of each binder was added thereto while stirring. Subsequently, after adding latex a water-proofing agent was added and was further stirred for 40–60 minutes to obtain a sufficiently uniform dispersion.

TABLE 2
[Unit: parts by weight]

| Color number | 1 | 2 | 3 | 4 | 5 | 6 | 7 | 8 | 9 |
|---|---|---|---|---|---|---|---|---|---|
| Pigment (clay) | 100 | 100 | 100 | 100 | 100 | 100 | 100 | 100 | 100 |
| Latex | 8 | 8 | 8 | 8 | 8 | 8 | 8 | 8 | 8 |
| Tetrasodium pyrolic acid | 0.4 | 0.4 | 0.4 | 0.4 | 0.4 | 0.4 | 0.4 | 0.4 | 0.4 |
| Present product: | | | | | | | | | |
| No. 1 | 5 | 5 | | | | | | | |
| No. 2 | | | 5 | | | | | | |
| No. 3 | | | | 5 | | | | | |
| No. 4 | | | | | 5 | | | | |
| No. 5 | | | | | | 5 | | | |
| Control: | | | | | | | | | |
| No. 1 | | | | | | | 5 | | |
| No. 2 | | | | | | | | 5 | |
| Casein | | | | | | | | | 9 |
| Smirettsu resin #613 | 0.2 | 0.2 | 0.2 | 0.2 | 0.2 | 0.2 | 0.2 | 0.2 | 0.2 |
| Solid in color (weight percent) | 45 | 45 | 45 | 45 | 45 | 45 | 45 | 45 | 45 |

NOTE.—The blending materials in Table 2 were as follows:
Clay, S.P.S. English China Clay.
Latex, Dow Latex #636, styrene-butadiene copolymer latex manufactured by Dow Chemicals Co.
Casein, New Zealand lactic casein.
Smirettsu Resin #613, methylated methylol melamine manufactured by Smuitomo Chemical Co.
Tetrasodium pyrolic acid, manufactured by Taihei Chemical Co.

Next, in order to examine to confirm the actual water gloss solution treatment of coating color in Table 2, each of these coating color was coated on the paper with the use of coating rod No. 14 (R.D.S. Laboratory Coating Rod). Thus obtained coated paper was promptly subjected to three minutes curing at 105° C. by drier. After that the next experiment was conducted. In order to study the adaptability of coated paper to the water gloss solution treatment, water-resistances of the coated paper treated by several kinds of water-gloss treatment which is shown in the note below were measured to study the improvement in water resistance, within an hour after curing process.

Namely, cured coated paper was sticked on a sticky mount, with the coated surface being outside and then setted on the wet-abrasion measuring apparatus of abrasion tester (Taber Co., Model 503). On testing sample paper a definite amount (15 cc.) of water-gloss treatment solution was added, immediately thereafter being subjected to two-revolution abrasion. After one minute, each 50 revolution abrasion was subjected. Abrasion ring used was Model S-32 of abrasion tester Model 503, made by Taber Instrument Co., and abrasion pressure was 125 g. The more inferior the water resistance is, the more clay on the coat layer is losed and the more the solution is whitened, by this abrasion test. To this whitened liquid was added pure water to adjust the total volume to be definite (100 cc.).

The rate of transmission (460 mμ) of this whitened liquid was measured by spectronic photometer manufactured by Shimazu Seisakusho, to evaluate the water-resistance.

The result shows that the better the water resistance is, the larger the rate of transmission is. (The rate of transmission is shown by the rate (%) to pure water (100%))

The result was shown in Table 3.

TABLE 3

| Treating solution | A | B | C | D | E |
|---|---|---|---|---|---|
| Coating color No.: | | | | | |
| 1 | (¹) | 99.0 | 99.2 | 96.2 | |
| 2 | 94.0 | 99.2 | 99.2 | 99.0 | |
| 3 | 92.0 | 99.0 | 99.1 | 98.0 | |
| 4 | 94.7 | 99.5 | 99.6 | 98.8 | |
| 5 | 95.0 | 99.7 | 99.7 | 98.6 | |
| 6 | 94.5 | 99.3 | 99.6 | 98.5 | |
| 7 | 88.5 | 89.5 | 90.0 | 99.0 | |
| 8 | 88.0 | 89.0 | 89.5 | 99.0 | |
| 9 | 90.6 | | | | 99.0 |

¹ Unmeasured (peel off).

NOTE.—
A. pure water.
B. 2% solution of aluminum trichloride.
C. 2% solution of aluminum sulfate.
D. 3% solution of borax.
E. 3% solution of zinc sulfate.

Besides, in case of coating colors No. 7 and No. 8 which uses controls No. 1 and No. 2, solution D was found to be excellent.

Thus, in respect of water-resistance borax solution treatment process showed almost the same improvement as that process in which casein as the binder and zinc sulfate as the treating solution were employed.

Next the coated paper coated by coating colors shown in Table 2 was treated by treating solution shown in Table 3, and then subjected to the printing test. The result was shown in Table 4.

Namely, within one hour after the curing was subjected on the coated paper, the coated paper was dipped for 5 seconds in treating solution shown in Table 3. Then the excess solution was taken away by rubber roll.

This treated coated paper was left as it is for 24 hours at 20° C. under 65% RH and then subjected to super calender to obtain the test sample for printing test.

The super calender process was conducted at 70° C. under calender pressure 110 kg./cm., three times in different directions.

The coated paper after super calender process was left as it is for further 24 hours at 20° C. under 65% RH and then subjected to printing test.

The result was shown in Table 4.

TABLE 4

| Coating color No.: | Treating solution | K&N test | Ink-set (percent) | Surface strength (cm./sec.) |
|---|---|---|---|---|
| 1 | A | ○ | 76.0 | ○ |
|  | B | ○ | 78.0 | ◎ |
|  | C | ○ | 78.2 | ◎ |
|  | D | × | 69.0 | ○ |
| 2 | A | ○ | 76.2 | ○ |
|  | B | ○ | 77.5 | ◎ |
|  | C | ○ | 78.0 | ◎ |
|  | D | × | 68.5 | ○ |
| 3 | A | ○ | 74.5 | ○ |
|  | B | ○ | 75.6 | ◎ |
|  | C | ○ | 76.2 | ◎ |
|  | D | × | 68.0 | ○ |
| 4 | A | ○ | 75.5 | ○ |
|  | B | ○ | 77.0 | ◎ |
|  | C | ○ | 77.8 | ◎ |
|  | D | × | 69.0 | ○ |
| 5 | A | ○ | 74.3 | ○ |
|  | B | ○ | 77.2 | ◎ |
|  | C | ○ | 77.5 | ◎ |
|  | D | × | 69.0 | ○ |
| 6 | A | ○ | 75.0 | ○ |
|  | B | ○ | 76.8 | ◎ |
|  | C | ○ | 77.0 | ◎ |
|  | D | × | 68.8 | ○ |
| 7 | A | ○ | 68.5 | ○ |
|  | B | ○ | 69.5 | ○ |
|  | C | ○ | 69.3 | ○ |
|  | D | × | 52.9 | ○ |
| 8 | A | ○ | 69.0 | ○ |
|  | B | ○ | 68.5 | ○ |
|  | C | ○ | 69.2 | ○ |
|  | D | × | 51.0 | ○ |
| 9 | A | ○ | 50.0 | ○ |
|  | E | ○ | 51.0 | ○ |

NOTE.—
1. ◎=highly excellent (more than 150 cm/sec.); ○=excellent (ranging from 100 cm/sec. to 150 cm/sec.); ×=inferior (less than 100 cm/sec.).
2. K & N Test: The test was carried out according to the TAPPI routine control. ○=excellent (ranging from 35% to 40%); ×=inferior (less than 35%).
3. Ink-set: IGT printing testing machine and the gloss meter manufactured by Murakami Method Color Institute were used. Printing condition: ink, India ink, made by Dainippon Ink Co. tack value 10; pressure, 15 kg./cm.; disc, 2 cm. wide; velocity, Pendrum. After 5 minutes of printing, combination printing was conducted on commercially availabe art paper. After 24 hours the diffusion reflection rate was measured by gloss meter with 0°-45° blue filter.
4. Surface strength: The test was conducted according to the I.G.T. printing test. Printing condition: ink, I.P.I. picking ink #6; pressure; 35 kg./cm.; velocity, Pendrum or, spring drive A or B; evaluation, swelling, coat-peeling and continuous peeling were checked (20° C., 65% RH); raw paper, 84 g./m.².

Table 4 shows the markedly good adaptability for printing of coating color (coating color No. 1, 2, 3, 4, 5 and 6) according to the present invention.

Of these colors, coating color No. 1 has no water-proofing agent at the time of coating, and still remarkable enhancement in water-resistance by aluminum chloride solution and aluminum sulfate solution are observed, in addition to notable improvement in printing adaptability.

Example 2

Colors in Table 5 were prepared according to the conventionally known method, with the use of the article No. 1 of the present invention.

TABLE 5
[Unit: part by weight]

| Coating color number | 10 | 11 | 1 |
|---|---|---|---|
| Pigment: | | | |
| Clay | 100 | 100 | 98 |
| Al₂O₃ | | | 2 |
| Latex | 8 | 8 | 8 |
| Tetrasodium pyrophosphate | 0.4 | 0.4 | 0.4 |
| Article No. 1 of the present invention | 5 | 5 | 5 |
| Al₂(SO₄)₃ | | 0.5 | |
| Sumirettsu Resin #613 | 0.2 | 0.2 | 0.2 |
| Solid content in color (weight %) | 45 | 45 | 4.5 |

NOTE.—The blending materials in Table 5 are as follows: Clay; S.P.S English China Clay; latex, Dow Latex #636, manufactured by Dow Chemical Co., styrene-butadiene copolymer latex; casein, New Zealand lactic casein; Sumirettsu Resin §613, methylated methyl or melamin made by Sumitomo Chemical Industries Co.; tetrasodium pyrophosphate; Taihei Chemical Co.

Next, coating colors in Table 5 were painted with the use of coating rod No. 14 (R.D.S. Laboratory Coating Rod). After three minutes causing at 105° C. water-resistance of coated paper was measured. The water-resistance was measured by abrasion tester (Model 503, made by Taber Co.) shown in Example 1. Measuring condition is same with that of Example 1 except that treating solution was changed. This time pure water was used as the treating solution.

The result of measurement was shown in Table 6.

TABLE 6

| Coating color No.: | Water resistance (percent) |
|---|---|
| 10 | 94.0 |
| 11 | 99.7 |
| 12 | 94.1 |

Example 3

Into the Kady mill were charged water and tetrasodium pyrophosphate and then under stirring clay and calcium carbonate were added twice, thereafter being dispersed by stirring for about 30 minutes to obtain clay slurry.

To the clay slurry was added previously prepared Article No. 1 dissolved in water and then stirred for 30 minutes to be stored.

Then, styrene-butadiene copolymer latex, water proofing agent and water for adjusting concentration were further added and stirred for 60 minutes to obtain coating color.

The composition of thus obtained coating color was shown in Table 7.

TABLE 7

| Additives | Amount (net), parts by weigh |
|---|---|
| Clay: | |
| Ultra white-99 | 43 |
| Gieglite-MC | 43 |
| Calcium carbonate | 10 |
| Titanium dioxide (anatase) | 4 |
| Article No. 1 of the present invention | 6 |
| Latex | 9 |
| Water-proofing agent | 0.5 |
| Tetrasodium pyrophosphate | 0.4 |

NOTE.—Ultra-white-90, clay produced in U.S.A.; Geiglite-MC; clay manufactured by Gieglite Mining Co.; latex, Dow latex #636, manufactured by Dow Chemical Co., styrene-butadiene copolymer latex; waterproofing agent, Sumirettsu resin #613, methylate methylol melamine, manufactured by Sumitomo Chemical Industries Co.; tetrasodium pyrophosphate, Toha Synthetic Chemical Industries Co.

The obtained coating color was painted by air-knife coater and then painting adaptability, workability of water-gloss treating solution and printing adaptability of treated coated paper were evaluated.

Painting condition was as follows:

Painting method: one-side painting
Coater: metering rodair knife coater manufactured by Kobayashi Seisakusho Co.
Air slit: 0.65 mm.
Velocity: 80 m./mm.
Dried part of color: 12 m.

Treatment condition by water gloss solution was as follows:

Water gloss solution-treated part: calender stuck (at room temperature)
Water gloss solution: 2% solution of aluminum chloride
Back-side curl proofing solution: equivalent mixture of 2% water solution of polyvinyl alcohol (polymerization degree 1700, saponified degree 99.5 mol percent) and 2% water solution of wax emulsion.
Luster press condition: line pressure 50 kg. Temperature 140° C.

Above mentioned painting and water gloss solution treatment were almost same in respect to the workability as compared to that case in which casein as binder and water solution of zinc sulfate as water gloss solution were employed.

Namely neither stain on calender roll and luster press, nor any trouble by sticking was found at all.

The result of painting test was shown in Table 8.

TABLE 8

| | |
|---|---|
| Painting adaptability | good |
| Stain on calender by water gloss treatment | none |
| Sticked stain on lusterpress by water gloss treatment | none |
| Winding of luster press by water gloss treatment | none |

Thus obtained coated paper was then subjected to the printing test.

Test condition was as follows:

Printing machine: Rolland RKZ II
Ink: New-champion, manufactured by Dainippon Ink Chemical Industries Co.
Velocity: 5000–7000 sheets/hr.

The result was tabulated in Table 9.

TABLE 9

| Adaptability | Evaluation |
|---|---|
| Ink acceptability | Comparable. |
| Whiteness (white paper) | Superior. |
| Gloss (white paper) | Do. |
| Ink set | Do. |
| Printing brightness | Comparable. |
| Surface strength | Superior. |
| Blocking | Comparable. |

Evaluation was made by taking as the standard the coated paper which was prepared with the use of casein coating color and zinc sulfate solution as water gloss treatment solution.

Example 4

Coating colors shown in Table 5 were prepared by adding zinc sulfate to the coating color which employed the article No. 1 of the present invention.

TABLE 10
[Unit: part by weight]

| Coating color number | 13 | 14 | 15 |
|---|---|---|---|
| Pigment (clay) | 100 | 100 | 100 |
| Latex | 8 | 8 | 8 |
| Dispersing agent | 0.4 | 0.4 | 0.4 |
| Article No. 1 of the invention | 5 | 5 | |
| Control No. 2 | | | 5 |
| Sumirettsu resin #613 | 0.2 | 0.2 | 0.2 |
| Zinc sulfate | 0.2 | | 0.2 |

NOTE.—The additive employed was same with that shown in Table 2

In preparing coating colors in Table 10, zinc sulfate was added in the last stage of the process. The properties of the so obtained color were shown in Table 11.

TABLE 11

| Coating color number | 10 | 11 | 12 |
|---|---|---|---|
| Viscosity of coating color (cp.) | 12,500 | 12,300 | 12,000 |
| pH of coating color | 8.8 | 9.0 | 8.3 |

NOTE.—The viscosity of coating color was measured at 20° C. by a rotating viscometer (6 r.p.m.).

Next, these coating colors were painted as in the same way in Example 1 and after curing calender process was carried out at 70° C. under 110 kg./cm. of line pressure to obtain coated paper.

Then the water-resistance of the obtained coated paper was measured.

For the water gloss solution treatment, pure water was used.

TABLE 12

| Coating color No. | Water resistance |
|---|---|
| 13 | 99.2 |
| 14 | 94.0 |
| 15 | 88.0 |

Table 12 clearly shows that coating color No. 13 has superior water-resistance.

Then, the ink-acceptability of these coated papers were evaluated by K & N test to show the excellent result.

Example 5

Into a Kady style mill were charged water and sodium hexa-metaphosphoric acid. Then clay was added twice and after 30 minutes of stirring clay slurry was obtained. To the clay slurry was added at 90–95° C. previously prepared article No. 1 of the invention, further stirred to mix for 30 minutes and stored.

Into the storage tank were further added styrene-butadiene copolymer latex, water-proofing agent and water for adjusting concentration, and stirred for 60 minutes to obtain coating color. The composition of thus obtained coating color was described in Table 13.

TABLE 13

| Additive | Amount (kg.) |
|---|---|
| Sodium hexa-metaphosphoric acid | 1.2 |
| Pigment: | |
|    ultra white—90 | 22 |
|    Gieglite MC | 22 |
| Latex | 7.14 |
| Waterproofing agent | 0.139 |
| Article No. 1 of the invention | 2.2 |
| Water | 60 |

NOTE.—Sodium hexa-metaphosphoric acid:
10% water solution manufactured by Taihei Chemical Co.
Ultra white—90:
clay produced in U.S.A.
Gieglite MC:
clay manufactured by Gieglite Co.
Latex:
Dow Latex #636 styrene-butadiene copolymer latex, manufactured by Dow Chemical Co.
Water-proofing agent:
Smirettsu Resin #613 methylated methylol melamine manufactured by Sumitomo Chemical Industry Co.

The obtained coating color was painted by air-knife coater and then painting ability, workability of water gloss solution treatment and the printing ability of thus obtained coated paper were evaluated.

Painting condition was as follows:

Painting method:
One side painting with the use of metering rod-air knife coater, made by Kobayashi Seisakusho.
Air slit: 0.65 mm.
Air knife angle: 50°
Printing velocity: 90 m./min.
Dried part of coating color: 12 m.

Water gloss solution treatment was conducted in the condition below:

The part of water gloss solution treatment:
Calender stuck (at room temperature)
Water gloss solution:
3% water solution of zinc sulfate
Back side curl proofing agent:
Equivalent mixture of 2% water solution of polyvinyl alcohol ($\bar{P}$ 1700, saponification degree 99.5 mol percent) and 2% water solution of wax emulsion.
Drying:
Infrared drying
Luster press condition:
Line pressure 50 kg.
Temperature 140° C.

Above mentioned painting and water gloss solution treatment were almost same in respect to the workability as compared to that case in which conventional casein coating color was employed. The process could be carried out without any trouble.

Namely, neither stain on calender roll and luster press, nor any trouble by sticking was found at all.

The result of the test in 8000 m. was shown in Table 14.

TABLE 14

| | |
|---|---|
| Printing adaptability | good |
| Stain on calender by water gloss treatment | none |
| Stain on luster press by water gloss treatment | none |
| Winding of luster press by water gloss treatment | none |

Then the printing adaptability of thus obtained coated paper was tested.

The testing condition was as follows:

Printing machine: Komori B4 off-set printing machine (Komori Printing Works)
Ink: snap dry F gloss 14 rouge manufactured by Dainippon Ink Chemical Industry Co.
Velocity: 45 sheets/min.
Dipping water: fresh water The result was shown in Table 15.

TABLE 15

| Items | Evaluation |
|---|---|
| Acceptability | Comparable. |
| Gloss | Do. |
| Peeling | Do. |
| Set | Superior. |
| Backing | Comparable. |

Evaluation was made by taking as the standard the coated paper which was prepared with the use of casein coating color and zinc sulfate solution as the water gloss treating solution.

What is claimed is:

1. A coated paper having a base and a printing surface comprising:
   (a) a coating pigment binder containing a saponified copolymer which is saponified in an amount of at least 75 mol percent of acetate group contained in a copolymer selected from the group consisting of vinyl acetate-acrylamide and a polymer of vinyl acetate, acrylamide and one or more of other polymerizable monomer, wherein the acrylamide content is 0.5 to 40 mol percent and the saponified acrylamide content is not more than 3 mol percent; and
   (b) 1–30% by weight, based upon the saponified copolymer, of an aluminum salt which is water soluble and the water solution of which is colorless.

2. The coated paper of claim 1 wherein said aluminum salt is aluminum trichloride.

3. The coated paper of claim 1 wherein said aluminum salt is aluminum sulphate.

References Cited

UNITED STATES PATENTS

| | | | |
|---|---|---|---|
| 2,661,308 | 12/1953 | Azorlosa | 117—62.2 |
| 2,661,309 | 12/1953 | Azorlosa | 117—62.2 |
| 2,950,214 | 8/1960 | Smith | 117—62.2 |
| 3,020,176 | 2/1962 | Robinson et al. | 117—62.2 |
| 3,257,234 | 6/1966 | Gilman et al. | 117—62.2 |
| 3,297,472 | 1/1967 | Gilman et al. | 117—62.2 |
| 3,532,534 | 10/1970 | Wolff | 117—62.2 |

WILLIAM D. MARTIN, Primary Examiner

M. R. LUSIGNAN, Assistant Examiner

U.S. Cl. X.R.

117—62.2, 155 UA